(12) United States Patent
He et al.

(10) Patent No.: US 10,309,059 B2
(45) Date of Patent: Jun. 4, 2019

(54) METHOD OF DESIGNING MODEL PREDICTIVE CONTROL FOR CROSS DIRECTIONAL FLAT SHEET MANUFACTURING PROCESSES TO GUARANTEE TEMPORAL ROBUST STABILITY AND PERFORMANCE

(71) Applicant: Honeywell Limited, Mississauga (CA)

(72) Inventors: Ning He, Edmonton (CA); Xiaotao Liu, Edmonton (CA); Michael Forbes, North Vancouver (CA); Johan Backstrom, North Vancouver (CA); Tongwen Chen, Edmonton (CA)

(73) Assignee: Honeywell International Inc., Morris Plains, NJ (US)

( * ) Notice: Subject to any disclaimer, the term of this patent is extended or adjusted under 35 U.S.C. 154(b) by 252 days.

(21) Appl. No.: 15/273,705

(22) Filed: Sep. 23, 2016

(65) Prior Publication Data

US 2018/0087220 A1 Mar. 29, 2018

(51) Int. Cl.
*D21G 9/00* (2006.01)
*G05B 13/04* (2006.01)

(52) U.S. Cl.
CPC ......... *D21G 9/0027* (2013.01); *G05B 13/048* (2013.01); *G05B 2219/40148* (2013.01)

(58) Field of Classification Search
CPC .............. D21G 9/0027; G05B 13/048; G05B 2219/40148

(Continued)

(56) References Cited

U.S. PATENT DOCUMENTS 4,916,615 A  4/1990 Chittineni
5,566,134 A  10/1996 Dufault
(Continued)

FOREIGN PATENT DOCUMENTS

EP  2985907 A1 *  2/2016  ............. H02P 29/00

OTHER PUBLICATIONS

Fan et al., Two-dimensional frequency analysis for unconstrained model predictive control of cross-directional processes, Automatica 40 (11) (2004) 1891-1903.

(Continued)

*Primary Examiner* — Brian W Wathen
*Assistant Examiner* — Mohammed Shafayet

(57) ABSTRACT

Automated parameter tuning techniques for cross-directional model predictive control for paper-making under user-specified parametric uncertainties are developed. The CD-MPC design explicitly accounts for parametric model uncertainty while finding a value for the CD profile trajectory generation that minimizes the CD settling time of the measurement 2 sigma spread and does not exceed an overshoot limit for actuator 2 sigma spread. The inventive technique includes: (i) providing uncertainty specifications for the temporal parameters of the process model, (ii) specifying 2 sigma overshoot limits for the CD actuator profile, (iii) using robust stability theory to find a minimum bound for the profile trajectory tuning parameter, (iv) using a frequency domain technique to reduce the search range for the profile trajectory tuning parameter, and (v) performing an intelligent search for the tuning parameter that minimizes measurement 2 sigma settling time without exceeding the actuator 2 sigma overshoot limit.

20 Claims, 6 Drawing Sheets

(58) Field of Classification Search
USPC .......................................................... 700/127
See application file for complete search history.

(56) References Cited

U.S. PATENT DOCUMENTS

| | | | |
|---|---|---|---|
| 5,758,047 A | 5/1998 | Lu et al. | |
| 6,086,237 A | 7/2000 | Gorinevsky et al. | |
| 6,807,510 B1* | 10/2004 | Backstrom | D21G 9/0027 700/128 |
| 7,454,253 B2 | 11/2008 | Fan | |
| 7,459,060 B2 | 12/2008 | Stewart | |
| 7,577,483 B2 | 8/2009 | Fan et al. | |
| 7,650,195 B2 | 1/2010 | Fan et al. | |
| 7,820,012 B2 | 10/2010 | Stewart | |
| 8,224,476 B2 | 7/2012 | Chu et al. | |
| 9,122,261 B2 | 9/2015 | Lu | |
| 2004/0225469 A1* | 11/2004 | Backstrom | D21G 9/0027 702/150 |
| 2006/0111858 A1 | 5/2006 | Zhu | |
| 2007/0073422 A1* | 3/2007 | Gaikwad | G05B 11/42 700/37 |
| 2007/0100476 A1* | 5/2007 | Fan | D21G 9/0045 700/31 |
| 2009/0198350 A1* | 8/2009 | Thiele | G05B 13/042 700/30 |
| 2011/0093120 A1* | 4/2011 | Ando | B25J 9/1638 700/260 |
| 2013/0041482 A1* | 2/2013 | Badwe | G05B 13/048 700/29 |
| 2014/0174413 A1* | 6/2014 | Huang | F02B 47/08 123/568.18 |
| 2014/0358254 A1 | 12/2014 | Chu et al. | |
| 2015/0268645 A1 | 9/2015 | Shi et al. | |
| 2016/0041536 A1 | 2/2016 | Benosman et al. | |
| 2016/0076473 A1* | 3/2016 | Huang | F02M 26/21 701/108 |
| 2016/0147203 A1* | 5/2016 | Di Cairano | G05B 13/042 700/30 |
| 2016/0246266 A1* | 8/2016 | Kniazev | G05B 13/048 |
| 2018/0087221 A1* | 3/2018 | He | D21G 9/0054 |

OTHER PUBLICATIONS

Gorinevsky et al, Performance analysis of cross-directional process control using multivariable and spectral models, IEEE Transactions on Control Systems Technology 8 (7) (2000) 589-600.
Gorinevsky et al, Performance-optimal applied identi-fication of separable distributed-parameter processes, IEEE Transactions on Automatic Control 46 (10) (2001) 1548-1589.
S. R. Duncan, The cross-directional control of web forming process, Ph.D. thesis, University of London, UK (1989).
Laughlin et al, Robust performance of cross- directional control systems for web forming processes, Automatica 29 (6) (1993) 1395-1410.
Duncan et al, The spatial bandwidth of cross directional control systems for web processes, Automatica 33 (2) (1997) 139-153.
Stewart et al, Two-dimensional loop shaping, Automatica 39 (5) (2003) 779-792.
Stewart et al, Feedback controller de-sign for a spatially-distributed system: the paper making problem, IEEE Transactions on Control Systems Technology 11 (5) (2003) 612-628.
Fan et al, Approximate steady-state performance prediction of large-scale constrained model predictive control systems, IEEE Transactions on Control Systems Technology 13 (6) (2005) 884-895.
Fan et al, Automated tuning of large-scale multivariable model predictive controllers for spatially-distributed processes, in: American Control Conference, Minneapolis, MN, USA, 2006, pp. 5517-5523.
Van Antwerp et al, Cross-directional control of sheet and film processes, Automatica 43 (2) (2007) 191-211.
Featherstone, et al, Control-oriented modeling of sheet and film processes, AIChE Journal 43 (8) (1997) 1988-2001.
Gorinevsky et al, Identification tool for cross-directional processes, IEEE Transactions on Control Systems Technology 11 (5) (2003) 629-640.
Rojas et al, , Spatial frequency antiwindup strategy for cross-directional control problems, IEE Proceedings: Control Theory and Applications 149 (5) (2002) 414-422.

* cited by examiner

METHOD OF DESIGNING MODEL PREDICTIVE CONTROL FOR CROSS DIRECTIONAL FLAT SHEET MANUFACTURING PROCESSES TO GUARANTEE TEMPORAL ROBUST STABILITY AND PERFORMANCE

FIELD OF THE INVENTION

The present invention generally relates to monitoring and controlling continuous sheetmaking systems using model-based controllers and more specifically to techniques for designing a cross-directional (CD) model predictive controller (MPC) that provides robust temporal control performance in the presence of parametric model uncertainty.

BACKGROUND OF THE INVENTION

The control problems involved in paper-making processes can be divided into machine-directional (MD) control and cross-directional (CD) control. MD control concerns the paper properties along the direction towards which the paper moves while CD control focuses on the direction that is perpendicular to the machine direction.

CD control aims to reduce the variability of the paper property along the cross direction and to tune the dynamical property to meet the end users' specifications. The paper property is measured by a scanner mounted downstream traversing back and forth across the paper sheet; various feedback control strategies are proposed to achieve consistency of the paper profile. CD control is a challenging control problem that may involves hundreds of process actuators and hundreds or thousands of process measurements, and process models typically have a large amount of uncertainty associated with them. There are spatial and temporal aspects to this problem. The spatial aspect relates to variability of the process measurements across the sheet while the temporal aspect relates to variability of each process measurement over time.

Model predictive control (MPC), a control strategy which takes control and state constraints explicitly into consideration, has seen thousands of applications in industry, and has been recently introduced into CD control in paper-making processes with the advance of computational capability as well as the development of fast QP solvers. The spatially-distributed CD process is a two-dimensional (spatial and temporal) frequency process, and the spatial response and temporal response are decoupled. Consequently, the controller tuning of CD processes can be separated into spatial tuning and temporal tuning. Spatial tuning aims to tune the weighting matrices such that the steady-state paper property across the paper sheet is consistent; temporal tuning concerns more about the satisfaction of performance indices in terms of settling times and control signal overshoots.

Several research results about temporal tuning have been reported. In particular, a constructive procedure to design spatially-distributed feedback controllers has been developed and applied for paper-making processes. Some stability margin and parameter tuning criteria were obtained via rectangular circulant matrices (RCMs) for the unconstrained CD-MPC, which provided a guide in the parameter tuning algorithms. Furthermore, an approximate steady-state performance prediction technique was proposed to speed up the parameter tuning procedure for the constrained CD-MPC. An automated tuning method was presented for the CD process such that the performance and robustness could be simultaneously satisfied under unstructured uncertainty.

As the spatial and temporal aspects of the CD control design are handled independently, robust control performance in the time domain is focused for the temporal aspect. The corresponding design objective is that the control remains temporally stable and the desired CD profile temporal performance is guaranteed in spite of uncertainty about the process model. However, there is lack of an easy-to-use technique to tune a CD controller to provide a robust temporal control performance that is characterized by intuitive indices, e.g., settling time, and to consider parametric model uncertainty, which is easy to understand by the user but is hard to handle for the design.

SUMMARY OF THE INVENTION

The present invention is based in part on the development of a CD-MPC design that explicitly accounts for parametric model uncertainty while finding a value for the CD profile trajectory generation that minimizes the CD settling time of the measurement 2 sigma spread (from an initial high variability profile to a final low variability profile) and does not exceed an overshoot limit for actuator 2 sigma spread. The inventive technique includes: (i) providing parametric uncertainty specifications for the temporal parameters of the process model, (ii) specifying 2 sigma overshoot limits for the CD actuator profile, (iii) using robust stability theory to find a minimum bound for the profile trajectory tuning parameter, (iv) using a frequency domain technique to reduce the search range for the profile trajectory tuning parameter, and (v) performing an intelligent search for the tuning parameter that minimizes measurement 2 sigma settling time without exceeding the actuator 2 sigma overshoot limit.

In one aspect, the invention is directed to a system which forms a material in a spatially-distributed multivariable-array cross-directional process wherein the system includes:

at least one set of actuator arrays each distributed adjacent to the material in the cross direction (CD), wherein each set of actuator arrays is controllable to vary the properties of the material;

means for measuring and acquiring data about the properties of the material; and a multivariable model predictive controller (MPC) for providing CD control of the CD process, wherein the MPC, in response to signals that are indicative of the properties of the material, provides signals to the at least one set of actuator arrays to control properties of the material, wherein the MPC includes means for temporally tuning the MPC which includes:

(a) means for inputting nominal temporal model parameters and corresponding parametric uncertainty specifications;

(b) means for specifying a worst-case 2 sigma (2σ) overshoot limit for a CD actuator profile;

(c) means for developing a robust temporal stability condition based on the parametric uncertainty specifications;

(d) means for calculating a lower bound for a profile trajectory tuning parameter that assures robust stability;

(e) means for reducing a possible range of the tuning parameter by using a frequency domain technique; and (f) means for performing an intelligent search for the tuning parameter that minimizes worst-case measurement 2σ settling time without exceeding the actuator worst-case 2σ overshoot limit.

In another aspect, the invention is directed to a process control system having a multivariable model predictive controller (MPC) for providing control to a spatially-distributed multiple-array, sheetmaking cross-directional (CD) process having at least one manipulated actuator array and at least one controlled measurement array, a method of providing control of the multiple-array process that includes the steps of:

(a) tuning the MPC by the steps of:
 (i) inputting nominal temporal model parameters and corresponding parametric uncertainty specifications;
 (ii) specifying a worst-case 2 sigma ($2\sigma$) overshoot limit for a CD actuator profile;
 (iii) developing a robust temporal stability condition based on the parametric uncertainty specifications;
 (iv) calculating a lower bound for a profile trajectory tuning parameter that assures robust stability;
 (v) reducing a possible range of the tuning parameter by using a frequency domain technique; and
 (vi) performing an intelligent search for the tuning parameter that minimizes worst-case measurement $2\sigma$ settling time without exceeding the actuator worst-case $2\sigma$ overshoot limit;
(b) inputting the tuning parameters into the MPC; and
(c) controlling the multiple-array CD process with the MPC.

The present invention is particularly suited for so-called "single-beam" controller tuning which is tuning the MPC with respect to a single actuator array comprising of a plurality of manipulated actuators that are arranged in the CD and a corresponding single controlled measurement array. A feature of the present invention is a tuning algorithm in which temporal tuning aims to tune the parameters such that the performance indices such as the settling time of the measurement profile and the control signal overshoot, which can be easily understood by the technician-level operators and maintenance personnel, are satisfied. This can usually be realized by adding a weighted control effort in the associated cost function. However, if a smaller weighting parameter is chosen, then a larger control signal overshoot will be observed. On the other hand, if a larger weighting parameter is chosen, then it will take a longer time for the output profile to achieve a steady-state value. With the present invention, a temporal filter is adopted to smooth the reference trajectory, and a systematic procedure is developed to tune the parameter in the temporal filter to realize a trade off between the settling time and the control signal overshoot.

Ubiquitously existing uncertainties make the temporal tuning more challenging. The parameters in CD processes are usually identified through bump tests and are inevitably subject to model uncertainties, which may be highly structured. Thus, it is necessary that temporal tuning algorithms be robust to the uncertainties. In existing tuning techniques, the mentioned uncertainty is normally characterized by the unstructured uncertainty in the frequency domain, which is hard to understand by technician-level operators and maintenance personnel. In the present invention, the uncertainty is considered by parametric uncertainty to improve the user-friendliness of the technique.

Novel aspects of the present invention include:
(1) worst-case temporal performance indices are defined and a technique to evaluate all the possible performance under the pre-specified parametric uncertainty is proposed.
(2) an automatic tuning algorithm for the parameter in the temporal filter is presented to guarantee satisfactory performance in terms of the worst-case settling time and control signal overshoot under user-specified parametric uncertainty. In the presence of parametric uncertainties, the tuning is based on the worst-case situation, which ensures that the required performance indices are satisfied.

DETAILED DESCRIPTION OF PREFERRED EMBODIMENTS

Figure 1:
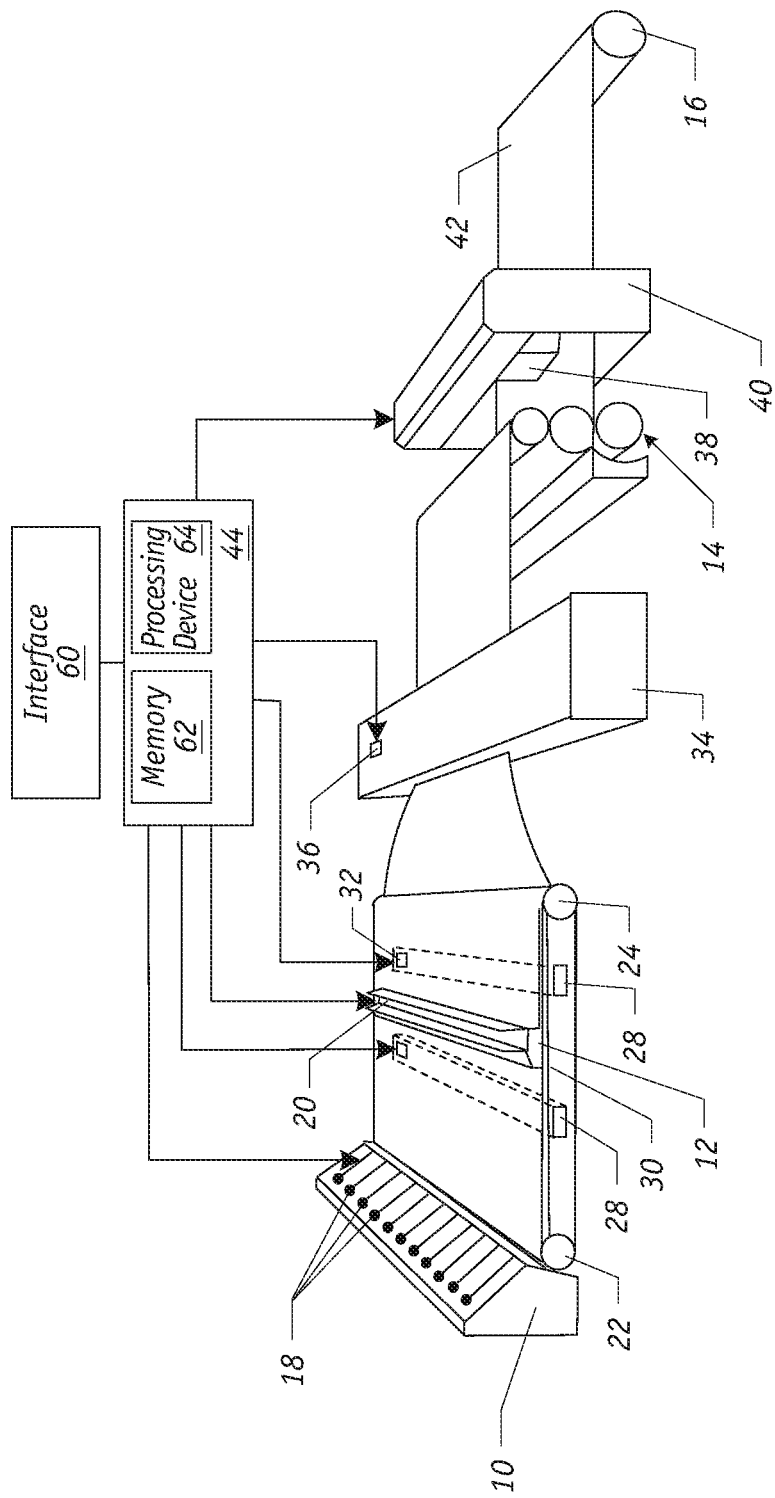
FIGS. 1, 2, and 3 are schematic illustrations of a papermaking system.

As shown in FIG. 1, a system for producing continuous sheet material includes various processing stages such as headbox 10, steambox 12, a calendaring stack 14 and reel 16. The array of actuators 18 in headbox 10 controls the discharge of wet stock (or feedstock) material through a plurality of slices onto supporting web or wire 30 which rotates between rollers 22 and 24. Similarly, actuators 20 on steambox 12 can control the amount of steam that is injected at points across the moving sheet. Sheet material exiting the wire 30 passes through a dryer 34 which includes actuators 36 that can vary the cross directional temperature of the dryer. A scanning sensor 38, which is supported on supporting frame 40, continuously traverses and measures properties of the finished sheet in the cross direction. The finished sheet product 42 is then collected on reel 16. As used herein, the "wet end" portion of the system includes the headbox, the web, and those sections just before the dryer, and the "dry end" comprises the sections that are downstream from the dryer. Typically, the two edges of the wire in the cross direction are designated "front" and "back" (alternatively, referred as the "high" and 'low") with the back side being adjacent to other machinery and less accessible than the front side.

The system further includes a profile analyzer 44 that is connected, for example, to scanning sensor 38 and actuators 18, 20, 32 and 36 on the headbox 10, steam box 12, vacuum boxes 28, and dryer 34, respectively. The profile analyzer is a computer which includes a control system that operates in response to the cross-directional measurements from scanner sensor 38. In operation, scanning sensor 38 provides the analyzer 44 with signals that are indicative of the magnitude of a measured sheet property, e.g., caliper, dry basis weight, gloss or moisture, at various cross-directional measurement points. The analyzer 44 also includes software for controlling the operation of various components of the sheetmaking system, including, for example, the above described actuators. To implement to the control system of the present invention, analyzer 44 can include memory 62 and processing devices 64 to execute software/firmware instructions for performing various operations related to MPC control of an industrial process. Interface 60 allows processing devices to receive data and provide signals to actuators or controllers.

Figure 2:
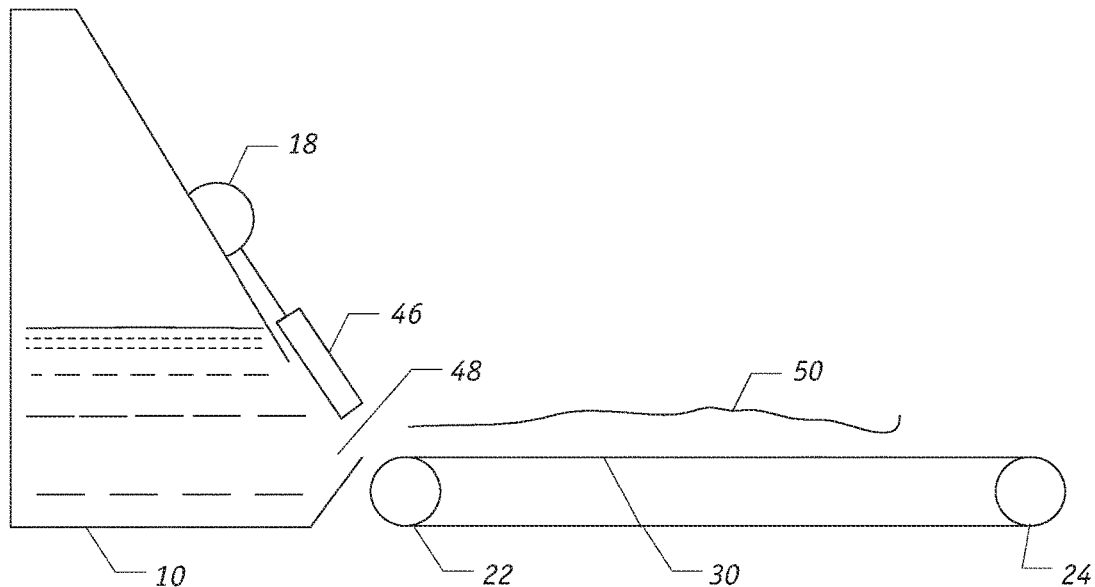

FIG. 2 depicts a slice lip control system which is mounted on a headbox 10 for controlling the extent to which a flexible slice lip member 46 extends across the discharge gap 48 at the base of the headbox 10. The slice lip member 46 extends along the headbox 10 across the entire width of the web in the cross-direction. The actuator 18 controls of the slice lip member 46, but it should be understood that the individual actuators 18 are independently operable. The spacing between the individual actuators in the actuator array may or may not be uniform. Wetstock 50 is supported on wire 30 which rotates by the action of rollers 22 and 24.

Figure 3:
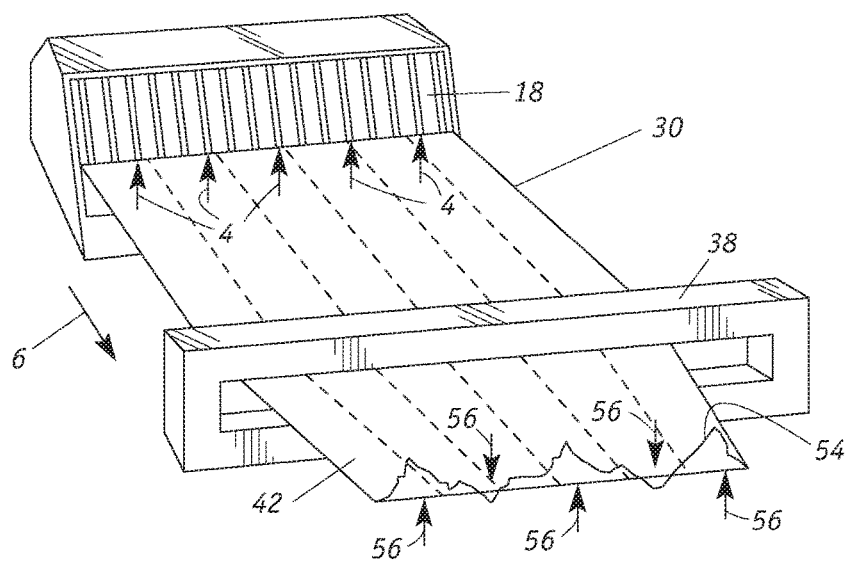

As an example shown in FIG. 3, the amount of feedstock that is discharged through the gap between the slice lip member and the surface of the web 30 of any given actuator is adjustable by controlling the individual actuator 18. The feed flow rates through the gaps ultimately affect the properties of the finished sheet material, i.e., the paper 42. Specifically, as illustrated, a plurality of actuators 18 extend in the cross direction over web 30 that is moving in the machine direction indicated by arrow 6. Actuators 18 can be manipulated to control sheet parameters in the cross direction. A scanning device 38 is located downstream from the actuators and it measures one or more of the properties of the sheet. In this example, several actuators 18 are displaced as indicated by arrows 4 and the resulting changes in sheet property is detected by scanner 38 as indicated by the scanner profile 54. By averaging many scans of the sheet, the peaks of profile 54 indicated by arrows 56 can be determined. This type of operation is typically used in traditional open and closed-loop bump tests. It should be noted that besides being positioned in the headbox, actuators can be placed at one or more strategic locations in the papermaking machine including, for example, in the steamboxes, dryers, and vacuum boxes. The actuators are preferably positioned along the CD at each location.

It is understood that the inventive technique is sufficiently flexible as to be applicable for online implementation with any large-scale industrial multiple actuator array and multiple product quality measurements cross-directional process that is controlled by a single-input-single-output (SISO) controller or by a multivariable model predictive controller (MPC) such as in papermaking. Suitable paper machine processes where paper is continuously manufactured from wet stock are further described, for instance, in U.S. Pat. No. 6,807,510 to Backstrom et al., and U.S. Pat. No. 8,224,476 to Chu et al., and U.S. 2015/0268645 to Shi et al., which are incorporated herein by reference. The present invention employs so-called "bump tests" by disturbing selected actuators and detecting their responses. In particular, operating parameter on the sheetmaking system, such as a papermaking machine, is altered and changes of certain dependent variables resulting therefrom are measured. Bump tests techniques are described in U.S. Pat. Nos. 6,086,237 to Gorinevsky et al. and 7,459,060 to Stewart, which are incorporated herein by reference. While the invention will be described with respect to a paper-making machine, it is understood that the invention is applicable to industrial plastic sheetmaking, rubber sheetmaking, and sheet metal operations.

I. CD-MPC Structure

Figure 4:
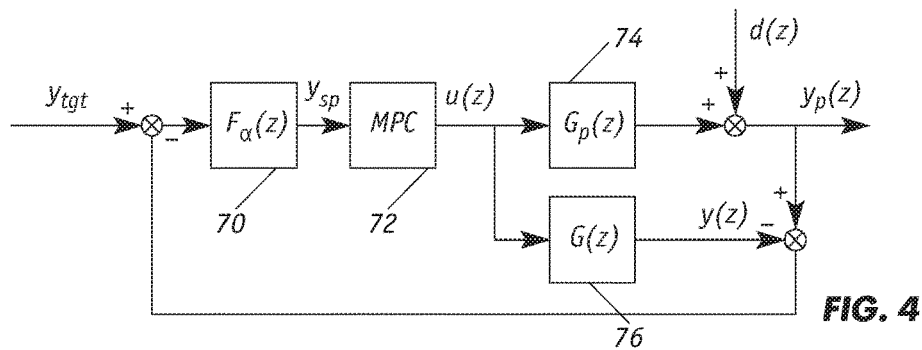
FIG. 4 is a block diagram of a closed-loop CD-MPC system.

As shown in FIG. 4, the closed-loop CD-MPC structure for a paper-making process consists of four parts: the real process $G_p(z)$ (74), the nominal model $G(z)$ (76), the MPC (72) and the temporal filter $F_\alpha(z)$ (70), which are illustrated in detail in the following. Moreover, the associated signals are defined as follows: $y_{tgt}$, $y_{sp}$, $u(z)$, $d(z)$, $y_p(z)$, and $y(z)$ are the output target, the reference trajectory, the actuator profile, the disturbance profile, the measurement profile, and the predicted output profile, respectively.

Nominal Model

The nominal model $G(z)$ of a CD paper-making process is characterized by $$G(z) = G_0 h(z), \quad h(z) = \frac{(1-a)z^{-t_d}}{1 - az^{-1}}, \tag{1}$$

where $G_0$ is a constant matrix that characterizes the spatial response/gain of the CD process; $h(z)$ is the temporal transfer function of the process, in which $a$ and $t_d$ are the time constant and time delay in the discretized version.

The spatial gain matrix $G_0$ has the parameterized structure as shown below:

$$G_0 = [g_1, \ldots, g_n] \in \mathbb{R}^{m \times n}, \tag{2}$$

$$g_k = f(x, \gamma, \eta, \xi, \beta, c_k)$$

$$= \frac{\gamma}{2} \left\{ e^{-\frac{\eta(x-c_k+\beta\xi)^2}{\xi^2}} \cos\left[\frac{\pi(x-c_k+\beta\xi)}{\xi}\right] + e^{-\frac{\eta(x-c_k-\beta\xi)^2}{\xi^2}} \cos\left[\frac{\pi(x-c_k-\beta\xi)}{\xi}\right] \right\},$$

$$x = 1, \ldots, m, \quad k = 1, \ldots, n,$$

where $\gamma$, $\eta$, $\xi$, and $\beta$ are the process gain, attenuation, width, and divergence, respectively. They are utilized to characterize the spatial response of each specific actuator. For the $k^{th}$ actuator, $c_k$ is the alignment parameter that determines the center of the corresponding spatial response.

Model Uncertainty

Since model-plant mismatch is unavoidable in process operation and identification, model uncertainties are considered in this disclosure. Based on traditional definitions in robust control to represent model mismatch, it is assumed that the real process model belongs to a set of possible models, characterized by an unstructured or parametric perturbation on the nominal model in (1). As parametric uncertainty is easy to understand and specify by the end users in the pulp and paper industry, the real process model $G_p(z)$ is then described by $$G_p(z) = G_0^p h_p(z), \tag{3}$$

$$G_0^p = [g_{1p}, \ldots, g_{np}],$$

$$g_{kp} = f(x, \gamma_p, \eta_p, \xi_p, \beta_p, c_k^p),$$

$$\gamma_p = (1+r_\gamma)\gamma, \quad \eta_p = (1+r_\eta)\eta,$$

$$\xi_p = (1+r_\xi)\xi, \quad \beta_p = (1+r_\beta)\beta,$$

$$c_k^p = c_k + \varepsilon,$$

$$h_p(z) = \frac{(1-a_p)z^{-t_{dp}}}{1 - a_p z^{-1}},$$

$$a_p = (1+r_a)a, \quad t_{dp} = (1+r_{t_d})t_d,$$

$$k = 1, \ldots, n, \quad x = 1, \ldots, m,$$

where $r_\gamma \in [\underline{r}_\gamma, \bar{r}_\gamma]$, $r_\eta \in [\underline{r}_\eta, \bar{r}_\eta]$, $r_\xi \in [\underline{r}_\xi, \bar{r}_\xi]$, $r_\beta \in [\underline{r}_\beta, \bar{r}_\beta]$, $r_\alpha \in [\underline{r}_\alpha, \bar{r}_\alpha]$, $r_{t_d} \in [\underline{r}_{t_d}, \bar{r}^{t_d}]$, and $\varepsilon \in [-\underline{\varepsilon}(m/n), \bar{\varepsilon}(m/n),]$ are utilized to characterize the parametric uncertainties. These trust ranges are also represented as $\gamma_p \in [\underline{\gamma}, \overline{\gamma}]$, $\eta_p \in [\underline{\eta}, \overline{\eta}]$, $\xi_p \in [\underline{\xi}, \overline{\xi}]$, $\beta_p \in [\underline{\beta}, \overline{\beta}]$, $\alpha_p \in [\underline{\alpha}, \overline{\alpha}]$, and $t_{dp} \in [\underline{t}_d, \overline{t}_d]$ for brevity; note that as $\varepsilon$ is a global perturbation on all $c_k^p$, $k=1, \ldots, n$, $\varepsilon \in [\underline{\varepsilon}, \overline{\varepsilon}]$ is utilized to represent the trust region of the alignment parameter. Therefore, a set of perturbed models can be characterized by the uncertain model parameters $\gamma_p$, $\eta_p$, $\beta_p$, $\xi_p$, $\varepsilon$, $\alpha_p$, $t_{dp}$.

CD Model Predictive Controller

For industrial CD-MPC controllers that are applied in paper mills, the following optimization problem is solved:

$$\min_{\Delta u(k)} \left\{ \sum_{i=1}^{H_p} (y(k+i) - y_{sp}(k+i))^T Q_1 (y(k+i) - y_{sp}(k+i)) + \right. \qquad (4)$$

$$\sum_{i=0}^{H_u-1} [\Delta u(k+i)^T Q_2 \Delta u(k+i) + (u(k+i) - u_{sp}(k+i))^T$$

$$\left. Q_3(u(k+i) - u_{sp}(k+i)) + u(k+i)^T Q_4 u(k+i)] \right\},$$

subject to the system dynamics defined in (1) and the constraints as follows:

$$\Omega \Delta u(k) \leq b - \Gamma u(k-1), \qquad (5)$$

where $H_p$ is the prediction horizon, and $H_u$ is the control horizon; $y(k) \in R^m$ and $y_{sp}(k) \in R^m$ are the predicted output profile and the corresponding reference signal; $u(k) \in R^n$ and $u_{sp}(k) \in R^n$ are the actuator profile and its reference; $\Delta u(k)$ ($=u(k)-u(k-1)$) is the change in the actuator profile; $Q_1$ to $Q_3$ are diagonal weighting matrices; $Q_4$ is the weighting matrix on the actuator bending/picketing in the following form:

$$Q_4 = q_4 S_b^T S_b, \qquad (6)$$

$$S_b = \begin{bmatrix} -1 & 1 & 0 & \cdots & \cdots & \cdots & 0 \\ 1 & -2 & 1 & \ddots & \ddots & \ddots & \vdots \\ 0 & 1 & -2 & \ddots & \ddots & \ddots & \vdots \\ \vdots & \ddots & \ddots & \ddots & \ddots & \ddots & \vdots \\ \vdots & \ddots & \ddots & \ddots & -2 & 1 & 0 \\ \vdots & \ddots & \ddots & \ddots & 1 & -2 & 1 \\ 0 & \cdots & \cdots & \cdots & 0 & 1 & -1 \end{bmatrix},$$

where $q_4$ is a scalar weight and $S_b \in R^{n \times n}$ is the "bending moment matrix". Note that for the actuator profile, the first and second order derivatives are incorporated in the matrix $S_b$, and thus the bending behavior is penalized in the cost function of CD-MPC. $\Omega$, $\Gamma$ and $b$ are the constraint matrices (vectors) derived based on the physical limitations of the process.

Temporal Filter

The traditional output reference trajectory is constructed as a step change, which requires the predicted output profile to track the output target immediately after the dead time of the process. To help the tuning, a temporal filter is utilized to generate the reference trajectory $Y_{sp}(k)$ based on $$Y_{sp}(k) = F_\alpha(y_{tgt}(k) - d_y(k)), \qquad (7)$$

where $y_{tgt}(k)$ is the output target, and $d_y(k) = y_p(k) - y(k)$ is the disturbance estimated based on the process output $y_p(k)$ and predicted output $y(k)$. $F_\alpha$ is the time domain implementation of $f_\alpha(z)$ based on $y_{sp}(z) = f_\alpha(z) I_m (y_{tgt}(z) - d_y(z))$ and $f_\alpha(z)$ is the temporal filter $$f_\alpha(z) = \frac{(1-a_r)z^{-t_d}}{1-a_r z^{-1}}, \qquad (8)$$

where $a_r = e^{-\Delta T/\alpha \sigma}$; $\Delta T$ is the sampling time, and $\sigma$ is the continuous-time time constant of the temporal transfer function of the process; $I_m$ represents an m-by-m identity matrix. Note that based on this filter, the aggressiveness of the control signal can be adjusted by the parameter $\alpha$ with $Q_2$ set to a small-valued scalar matrix.

Closed-Loop Transfer Functions

In order to analyze the properties of the CD-MPC shown in (4), we calculate the equivalent transfer matrices with the unconstrained MPC, and then evaluate robust stability and performance of the corresponding closed-loop system. To aid the analysis, the closed-loop system can be rearranged in FIG. 5. $K_r(z)$ (80) and $K_\alpha(z)$ (88) are derived based on the explicit solution of the unconstrained MPC. Note that as the unconstrained MPC is exploited, the resultant closed-loop system is linear.

Figure 5:
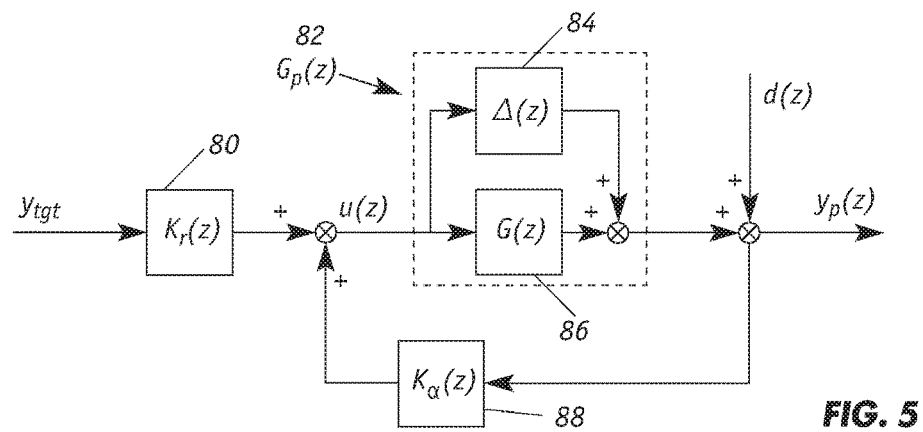
FIG. 5 is a block diagram of a closed-loop CD-MPC system.

In FIG. 5, $G_p(z)$ (82) is the real process that is different from the nominal model $G(z)$, (86) and can be represented in the additive uncertainty form $$G_p(z) = G(z) + \Delta(z), \qquad (9)$$

in which $\Delta(z)$ (84) denotes the model uncertainty.

Robust stability is analyzed using the small gain theorem. Specifically, given the parametric uncertainties defined in (3), the closed-loop system in FIG. 5 is robustly stable for all $G_p(z)$ if it is nominally stable and $$\|T_{ud}(z)\Delta(z)\|_\infty < 1 \rightarrow \overline{\sigma}(T_{ud}(e^{i\omega})\Delta(e^{i\omega})) < 1, \forall \omega, \qquad (10)$$

$$T_{ud}(z) = K_\alpha(z)[I - G(z)K_\alpha(z)]^{-1}, \qquad (11)$$

where $\overline{\sigma}(A)$ denotes the maximum singular value of a matrix A; $\Delta(z)$ is the model uncertainty in (9) and $T_{ud}(z) \in C^{m \times m}$ is the sensitivity function from the disturbance profile d(z) to the input profile u(z) at the nominal case.

Since the performance of CD control is characterized by its capability to suppress the disturbance, the closed-loop transfer function from the disturbance profile d(z) to the output profile y(z) is used to evaluate the performance $$T_{yd}(z) = [I - G(z)K_\alpha(z)]^{-1}, \qquad (12)$$

where $T_{yd}(z) \in C^{m \times m}$.

$T_{ud}(z)$ and $T_{yd}(z)$ are employed as the key transfer functions in this paper for evaluating the closed-loop system performance.

Given the CD-MPC structure shown in FIG. 4, the closed-loop system behavior is affected by the following parameters: the penalty matrices $Q_1$ to $Q_4$, the temporal filter parameter $\alpha$, the prediction horizon $H_p$, and the control horizon $H_u$.

Note that in industrial practices, the prediction horizon $H_p$ is normally selected to be 4 times the summation of the time constant and delay; the control horizon $H_u=1$ is usually utilized in large-scale MPC (can also be increased based on practical situations); $Q_1$ is often fixed in robust tuning. Consequently, only $Q_3$, $Q_4$, and $\alpha$ are the tuning parameters in this analysis. As the spatial tuning and temporal tuning can be considered independently, we only consider temporal tuning under temporal uncertainty in this analysis, and the corresponding design objective is to tune the parameters so that: (1) the closed-loop system is robustly temporal stable; (2) the performance indices, namely, settling times, control signal overshoots, meet the end users' specifications.

The traditional idea is to conduct the tuning based on the sensitivity functions $T_{yd} \in C^{m \times m}$ and $T_{ud} \in C^{n \times m}$ which, however, have very large dimensions (n can be as high as 300, and m as high as 2000). Such large dimensionality makes the analysis and tuning difficult, and therefore a two-dimensional frequency analysis is introduced in the next section.

II. Two-Dimensional Frequency Analysis

This section describes the two-dimensional frequency analysis of CD processes and illustrates the decoupling property of the two-dimensional frequencies. The spatially invariant property is one of the most important features of CD processes; this allows us to approximate the plant model G(z) as an rectangular circulant matrix (RCM), and further represent it in the two-dimensional (spatial and temporal) frequency domain. Thus, the multi-variable transfer function G(z) can be simplified into a group of single-input, single-output transfer functions. Denote $\check{G}$ (z) as the two-dimensional frequency domain representation of G(z), and it can be calculated by $$\check{G}(z) = F_m G(z) F_n^H, \tag{13}$$

where $F_m$ and $F_n$ are the complex Fourier matrices with dimension m and n, respectively. Without loss of generality, we assume m>n in this analysis. Then, all the frequency information of G(z) is contained in the following transfer functions:

$$\{\check{g}(v_1,z), \ldots, \check{g}(v_m,z)\} = DIAG(F_m G(z) F_n^H), \tag{14}$$

where DIAG(A) denotes the operation of getting the following elements of a rectangular matrix $A \in C^{m \times n}$: DIAG $(A)_1 = \{A(1, 1), \ldots, A(k, k), A(k+1+m-n, k+1), \ldots, A(m, n)\}$, where k=n/2 if n is even, or k=(n+1)/2 if n is odd; and $$\check{g}(v_j, z) = \frac{\check{g}(v_j)(1-a)z^{-t_d}}{1-az^{-1}}, \text{ for } j = 1, \ldots, n. \tag{15}$$

Note that based on (15), the spatial frequency response gain of G(z) at $v_j$ is $|\check{g}(v_j)|$, where $v_j$, j=1, . . . , n, are the spatial frequencies with engineering units.

Given the special structure of CD processes, it can be further shown that the corresponding sensitivity functions $T_{yd}$ (z), $T_{ud}$ (z) are also RCMs. Thus, they can also be analyzed in the two-dimensional frequency domain as follows:

$$\check{T}_{yd}(z) = F_m T_{yd}(z) F_m^H,$$

$$\check{T}_{ud}(z) = F_n T_{ud}(z) F_m^H,$$

$$\{\check{t}^{yd}(v_1,z), \ldots, \check{t}_{yd}(v_m,z)\} = \text{diag}(\check{T}_{yd}(z)),$$

$$\{\check{t}_{ud}(v_1,z) \ldots, \check{t}_{ud}(v_n,z)\} = DIAG(\check{T}_{ud}(z)), \tag{16}$$

where diag(A) represents the diagonal elements of a square matrix A. Therefore controller tuning can be implemented based on the sensitivity functions $\check{t}_{ud}$ (v, z) and $\check{t}_{yd}$ (v, z) in the two-dimensional frequency domain. Following the idea of CD-MPC tuning for unstructured uncertainty, the tuning task can be separated into two parts: spatial tuning at z=1 ($z=e^{i\omega}$, $\omega=0$) via $Q_3$ and $Q_4$, and temporal tuning at v=0 via the parameter α (which has the same function as $Q_2$). In the following, the temporal tuning is explored.

III. Temporal Tuning for CD-MPC

In this section, we develop the temporal tuning algorithm. In the temporal tuning part, we first calculate a lower bound of the tuning parameter α to guarantee robust stability at the spatial frequency v=0. Then, a tuning technique is proposed to find the parameter α to achieve the user-specified temporal performance.

Based on the small gain theory and the two dimensional analysis, the robust stability condition for temporal tuning can be represented as $$|\check{t}_{ud}(0, e^{i\omega})\delta(0, e^{i\omega})| < 1, \tag{17}$$

$$\forall \omega \to |\check{t}_{ud}(0, e^{i\omega})| < \frac{1}{|\delta(0, e^{i\omega})|}, \forall \omega,$$

where $\check{t}_{ud}$ (0, $e^{i\omega}$) and δ (0, $e^{i\omega}$) are $T_{ud}$ (z) and Δ(z) at spatial frequency v=0. Note that as $G_p(z)$ is an RCM because of the parametric uncertainty, $\Delta(z) = G_p$ (z)−G(z) is also an RCM based on the property that the RCM is closed on the summation operation. Therefore, Δ(z) can be transformed into two dimensional frequency domain (δ(v, $e^{i\omega}$) denotes its two dimensional form).

As the extreme system behavior normally happens at the extreme model parameters, the maximum value of |δ(0, $e^{i\omega}$)| can be obtained by solving $$\max_{a_p, t_{dp}} |\delta(0, e^{i\omega})|, \forall \omega \tag{18}$$

$$\text{s.t. } a_p \in \{\underline{a}, \bar{a}\}, t_{dp} \in \{\underline{t}_d, \bar{t}_d\}.$$

Then, a bisection search can be utilized for the smallest alpha (α) that satisfies (17), as increasing α can provide better robustness (i.e., α↑ leads to $|\check{t}_{ud}(0, e^{i\omega})|\downarrow$). Then, the obtained α is a lower bound for α that guarantees robust stability, and is denoted as α* hereafter. Note that only a finite number of temporal frequencies distributed from 0 to the Nyquist frequency may be considered in solving (18) due to the implementation issue.

In the temporal frequency domain, once robust stability is obtained, we move on to performance tuning. As existing robust tuning approaches normally consider frequency domain performance evaluation, which may not be intuitive to end users in the pulp and paper industry, the time domain performance indices, namely, measurement profile settling times and control signal overshoots, are utilized in this section. The traditional time domain indices are characterized based on the step response of each output measurement, which, however, is not applicable here due to the fact that CD processes, even for single beam cases, have hundreds of output measurements (which we call the measurement profile). Therefore, it is more intuitive and efficient to transform m dimensional output measurements into just one dimension and then to adopt the time domain performance indices. In this analysis, we select the spread of the two times of the standard deviation (2σ) of the input/output profile as the one dimensional representation which is widely used in the pulp and paper industry and is familiar to end users. Before proceeding, the temporal tuning indices are defined as follows.

Definition 1 (Overshoot of the 2σ spread). The overshoot of a stable 2σ spread is its maximum value minus the final value divided by the final value.

Definition 2 (Settling time of the 2σ spread). The settling time of a stable 2σ spread is the time required for the spread to reach and stay at its final value.

As uncertainties are considered on the dynamic parameters α and $t_d$, which results in a set of process models, an efficient visualization technique needs to be designed to evaluate the possible 2σ spreads. This visualization for the output 2σ spread can be obtained by solving the following optimization problems:

$$\min_{a_p, t_{dp}} 2\sigma(y_i(a_p, t_{dp})), \text{ for } i = 1, \ldots, l \tag{19}$$

$$\text{s.t. } a_p \in [\underline{a}, \overline{a}], t_{dp} \in [\underline{t}_d, \overline{t}_d],$$

$$\min_{a_p, t_{dp}} 2\sigma(y_i(a_p, t_{dp})), \text{ for } i = 1, \ldots, l \tag{20}$$

$$\text{s.t. } a_p \in [\underline{a}, \overline{a}], t_{dp} \in [\underline{t}_d, \overline{t}_d],$$

where l is the entire scan time for the process. Note that as the spatial gain matrix $G_0$ only affects the steady-state value of the 2σ, it is selected to be the worst spatial model based on a existing method, which produces the worst spatial performance (on the basis of the steady-state values of the 2σs).

Figure 6A:
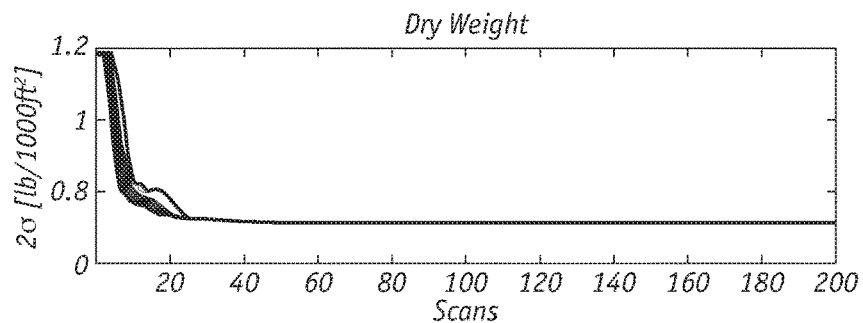
FIGS. 6(a) and 6(b) illustrate robust performance visualization for the $2\sigma$ spreads for the output and input, respectively.
Figure 6B:
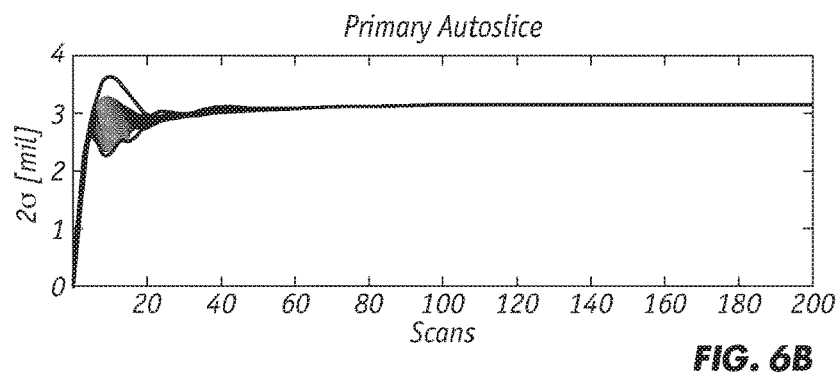

Based on the FOPDT structure of h(z), the extreme closed-loop system behavior happens when all the extreme parameters are taken simultaneously, and therefore the above optimization problems can be solved only at $a_p \in \{\underline{a}, \overline{a}\}$ and $t_{dp} \in \{\underline{t}_d, \overline{t}_d\}$ to obtain the envelope of the 2σ spreads. Similarly, this approach can also be applied on the input profile to achieve visualization. The performance of the visualization method based on optimization problems in (19) and (20) is verified through many industrial examples. To save space, only one typical result is shown in FIG. 6. Note that the model used here is a process in which weight is controlled by the primary autoslice, with the following uncertainties:

$$a_p \in [0.5\alpha, 1.5\alpha], t_{dp} \in [0.5 t_d, 1.5 t_d]. \tag{21}$$

The tuning objective of the temporal part is then formulated as $$\min_{\alpha} T_s(2\sigma(y)) \tag{22}$$

$$\text{s.t. } OS(2\sigma(u)) \leq OS^*,$$

where $T_s(2\sigma(y))$ and $OS(2\sigma(u))$ are the worst-case (longest) settling time of the output 2σ and the worst-case (largest) over-shoot of the input 2σ under pre-specified parametric uncertainties, respectively. OS* is the requirement on the worst-case overshoot. In the above tuning objective, the users can specify the maximum allowable overshoot on the input 2σ, and then solve the optimization problem in (22), yielding the tuning parameter that provides the smallest worst-case settling time of (22) efficiently, we separate the temporal tuning into two parts: (1) tuning in the frequency domain; (2) tuning in the time domain. In the frequency domain tuning, an upper limit on the sensitivity function $T_{yd}$ (z) at v=0 is first selected, and then we find an a to meet the bound while still guaranteeing robust stability.

Figure 7:
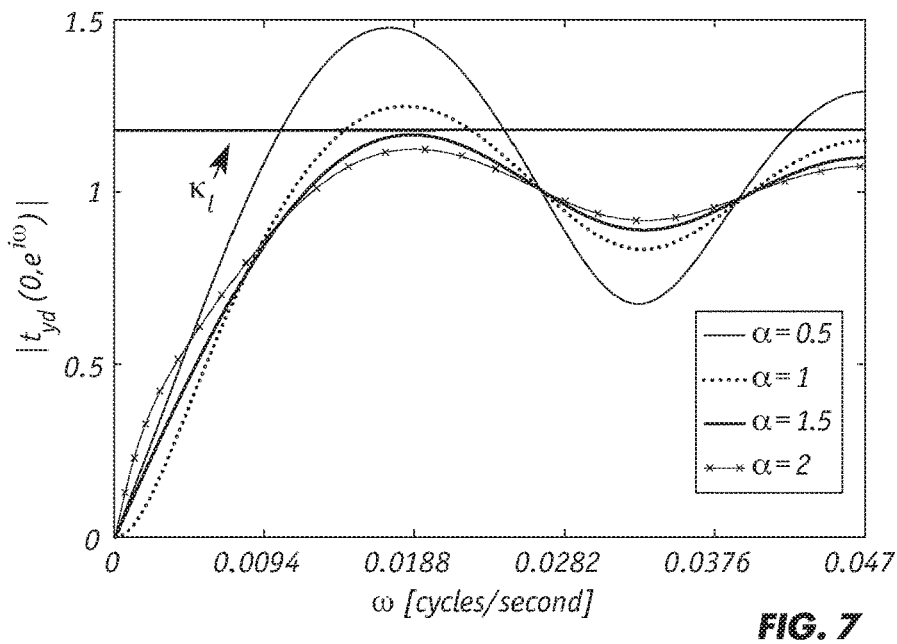
FIG. 7 illustrates the minimum limit on the maximum peak on the sensitivity function.

Define $\kappa_l$ as the minimum limit of the maximum peak of the sensitivity function (see FIG. 7), the objective here is to adjust α so that $$|\bar{t}_{yd}(0, e^{i\omega})| < \kappa_l, \forall \omega, \tag{23}$$

is satisfied. Then, the frequency domain tuning can be realized by solving:

$$\alpha_f = \max_{k=0,\ldots,k_{max}} \left(\alpha_{\omega_k}^m\right) \tag{24}$$

$$\alpha_{\omega_k}^m = \min(\alpha_{\omega_k}) \tag{25}$$

$$\text{s.t. } \alpha_{\omega_k} > \alpha^*, |\bar{t}_{yd}(0, e^{i\omega})| < \kappa_l,$$

where $\omega_k$, k=0, ..., $k_{max}$, are the temporal frequencies distributed from 0 to the Nyquist frequency. $\kappa_l$ can be selected according to OS* and the longest time constant of a process model for the given parametric uncertainties, and is normally between 1.2 and 1.8. It is worth noting that the frequency domain tuning may result in an α with OS>OS*, and thus the time domain tuning is implemented to fine tune the parameter.

In the time domain tuning, the parameter α is fine tuned to find the optimal α (denoted as $\alpha^t$) that provides the smallest worst-case settling time while still satisfying the requirement on OS. Since OS(2σ(u)) is a monotonically decreasing function of α, the bisection search can be utilized to find the $\alpha^t$ based on the closed-loop simulation with the following procedure. If the OS with $\alpha_f$ is larger than the specification, the search is implemented in the region $\alpha \in [\alpha_f, \alpha_u]$, where $\alpha_u$ is the upper bound for α with $\kappa_l$=1.2, and $\alpha_f$ is obtained in the frequency tuning. Otherwise, the search is implemented in the region $\alpha \in [\alpha_l, \alpha_f]$, where $\alpha_l$ is the lower bound for a with $\kappa_l$=1.8. To sum up, the temporal tuning part is implemented using the following algorithm:

Algorithm 1 Temporal Tuning
 1: Input OS*;
 2: Input the parametric uncertainty specifications [$\underline{\alpha}$, $\overline{\alpha}$] and [$\underline{t}_d$, $\overline{t}_d$];
 3: Calculate the lower bound for robust stability α*;
 4: Implement the frequency tuning to achieve $\alpha_f$;
 5: if OS($\alpha_f$)>OS* then
 6: Search in [$\alpha_f$, $\alpha_u$] for $\alpha^t$;
 7: else
 8: Search in [$\alpha_l$, $\alpha_f$] for $\alpha^t$;
 9: end if
 10: End Implementing the tuning procedure in Algorithm 1, the automated temporal tuning costs about 6 seconds on a computer with i5 CORE and 6G RAM.

Remark 1. To save more computation time, we can also stop the algorithm if OS($\alpha_f$)≤OS*. This can avoid the tuning in the time domain once the requirement is satisfied in the frequency tuning.

Figure 9A:
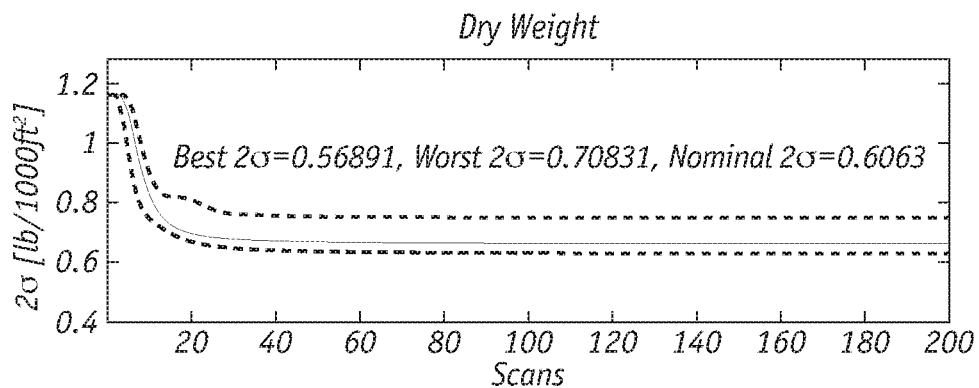
FIGS. 9(a) and 9(b) illustrate visualization technique for both worst- and best-case $2\sigma$ spreads.
Figure 9B:
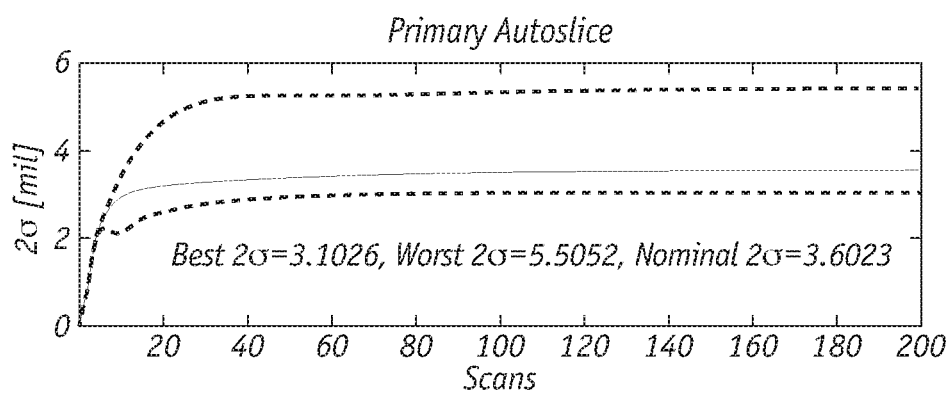

Remark 2. The visualization technique can also be extended to characterize the envelope of the 2σ spreads for the best spatial performance under the given parametric uncertainties, based on the best spatial model (with the best spatial frequency property and can be achieved similarly as the worst spatial model). Combining the best and worst envelope spreads results in a more detailed visualization result, which is shown in FIG. 9. Here the lower broken line represents the best 2σ spread (with smallest steady state value and settling time), while the upper broken line is for the worst 2σ spread (with largest steady state value and settling time); the area in between indicates all possible 2σ spreads for the given parametric uncertainties; and the solid line represents the nominal case.

Figure 8:
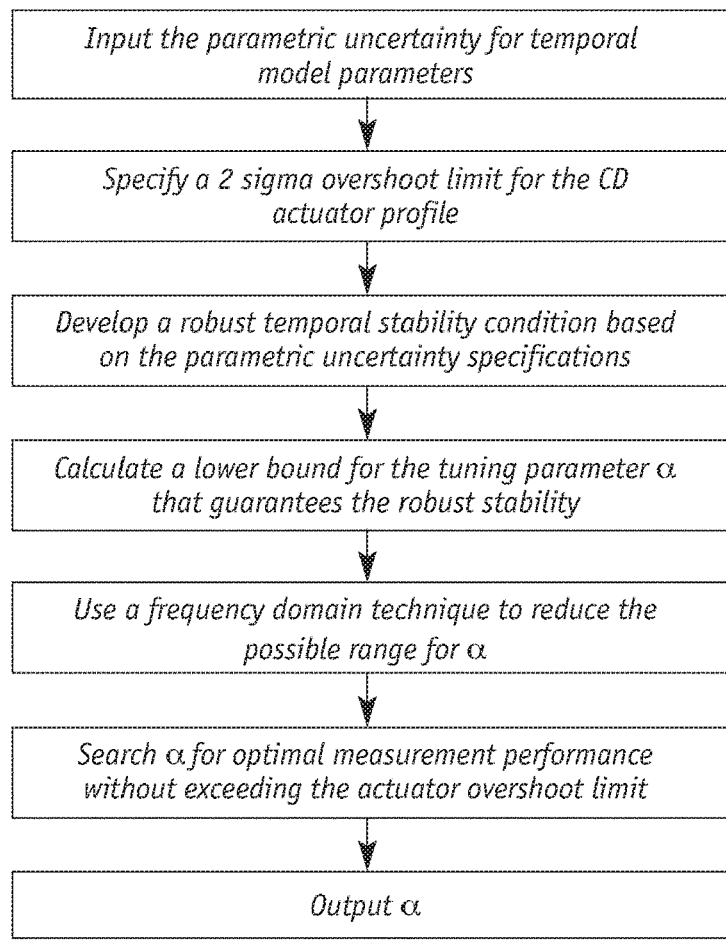
FIG. 8 is a flow chart of the automated temporal tuning.

As illustrated in FIG. 8, automatic temporal tuning of the CD-MPC includes of the following 7 steps:

(1) Input the nominal temporal model parameters and the corresponding parametric uncertainty specifications. The "nominal temporal model parameters" refers to the parameters of the temporal mathematical model of the process obtained from the model identification procedure. The "parametric uncertainty" refers to the trust ranges around the nominal temporal model parameters, which characterize the possible mismatch between the identified model and the real process.

(2) Specify a 2 sigma ($2\sigma$) overshoot limit for the CD actuator profile. The "worst-case $2\sigma$ overshoot" refers to the largest overshoot of all possible $2\sigma$ spreads given the parametric uncertainty specifications. The definition of $2\sigma$ overshoot is set forth in Definition 1.

(3) Develop a robust temporal stability condition based on the parametric uncertainty specifications. The "robust temporal stability condition" refers to the requirement on the temporal frequency response of the closed-loop system, which guarantees the robust stability under the parametric uncertainty. Given the robust temporal condition, the frequency responses of a large number of uncertain models based on the parametric uncertainty need to be tested. Based on the analysis in the present invention, the condition can be checked based on only 4 critical frequency responses (as illustrated in equation (8)). This saves computational time and guarantees the design/tuning procedure of the digital controller can be accomplished within the required amount of time.

(4) Calculate a lower bound for the profile trajectory tuning parameter $\alpha$ that guarantees the robust stability. The "profile trajectory tuning parameter" refers to a parameter ($\alpha$) in the temporal filter (as defined by equation (8)) that can affect the aggressiveness of the reference trajectory (as defined by equation (7)). The "a lower bound for (the profile trajectory tuning parameter)" refers to the smallest value of the tuning parameter that guarantees the robust stability condition.

(5) Use a frequency domain technique to further reduce the search range for $\alpha$. The "search range for $\alpha$" refers to the range of the tuning parameter within which the optimal tuning parameter may exist.

(6) Perform an intelligent search for $\alpha$ that minimizes measurement $2\sigma$ settling time without exceeding the actuator $2\sigma$ overshoot limit. The "worst-case measurement $2\sigma$ settling time" refers to the longest settling time of all possible $2\sigma$ spreads given the parametric uncertainty specifications ($2\sigma$ setting time is described in Definition 2). Based on the definition of worst-case overshoot/settling time, the $2\sigma$ overshoot/settling time of a large number of $2\sigma$ spreads given the parametric uncertainty need to be calculated to find the worst-case $2\sigma$ overshoot/settling time, which requires a lot of computational time (as illustrated in equations (19)-(20)). Based on analysis in the invention, the worst-case $2\sigma$ overshoot/settling time can be calculated only based on 4 extreme models, which significantly reduces the computational time; this guarantees the design/tuning procedure of the digital controller can be accomplished within the required amount of time. The "intelligent search" refers to a two-step frequency- and time-domain combined search method that can find the optimal tuning parameter within a small amount of time. Given the performance requirement, the intelligent search first finds a potential tuning parameter based on equations (24)-(25) with the temporal frequency analysis, and then fine tunes the parameter for optimality with line 5-10 in Algorithm 1. The proposed two-step search in the invention guarantees the optimality and the computational efficiency of the intelligent search, which makes the tuning/design procedure of the digital controller can be accomplished within the required amount of time.

(7) Output the tuning parameter $\alpha$.

IV. Simulation Results with Real-Time Simulator

We apply the proposed automated robust temporal tuning algorithms to a process model obtained from a paper mill in Canada. This is a single beam process in which the dry weight of the output profile is controlled by the primary autoslice.

In this test, the parametric uncertainty specifications are given as $$\gamma_p \in [0.75\gamma, 1.25\gamma],\ \eta_p \in [0.75\eta, 1.25\eta], \quad (26)$$
$$\beta_p \in [0.75\beta, 1.25\beta],\ \xi_p \in [0.75\xi, 1.125\xi],$$
$$a_p \in [0.5a, 1.5a],\ t_{d_p} \in [0.5t_d, 1.5t_d],$$
$$\varepsilon \in \left[-0.6\frac{m}{n}, 0.6\frac{m}{n}\right].$$

Then, the requirement of the robust temporal tuning of CD-MPC is to guarantee that the time-domain performance indices are satisfied, i.e., a fast settling time with the worst-case overshoot of the actuator $2\sigma$ less than OS*=20%.

Figure 10A:
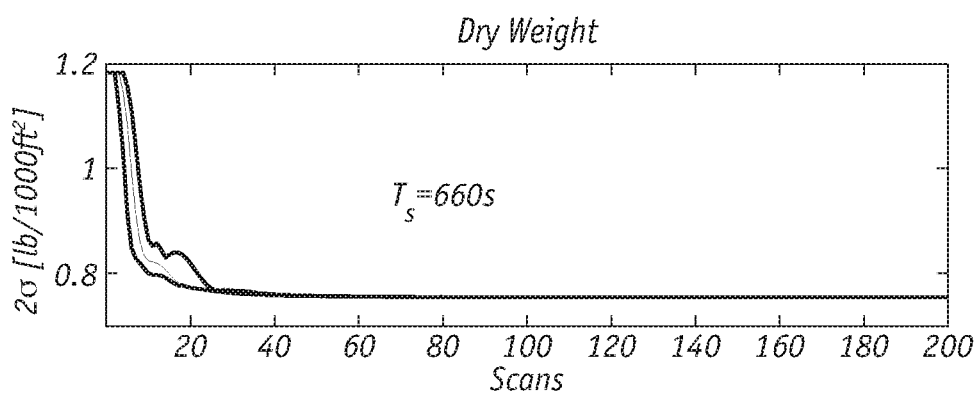
FIGS. 10(a) and 10(b) are the temporal tuning result for the proposed approach.
Figure 10B:
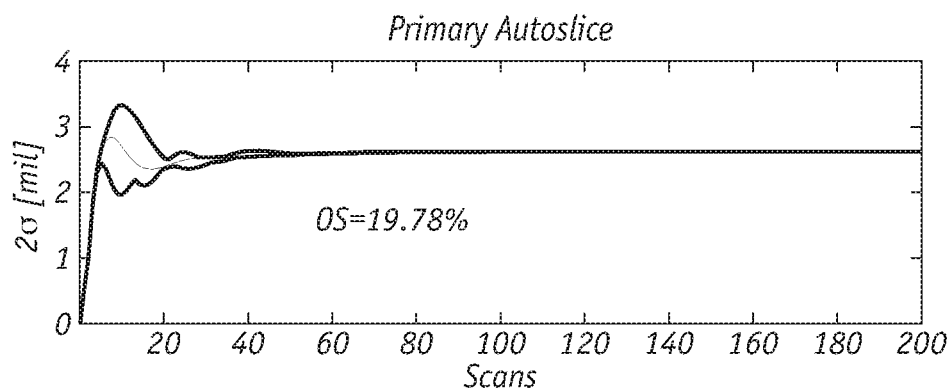
Figure 11A:
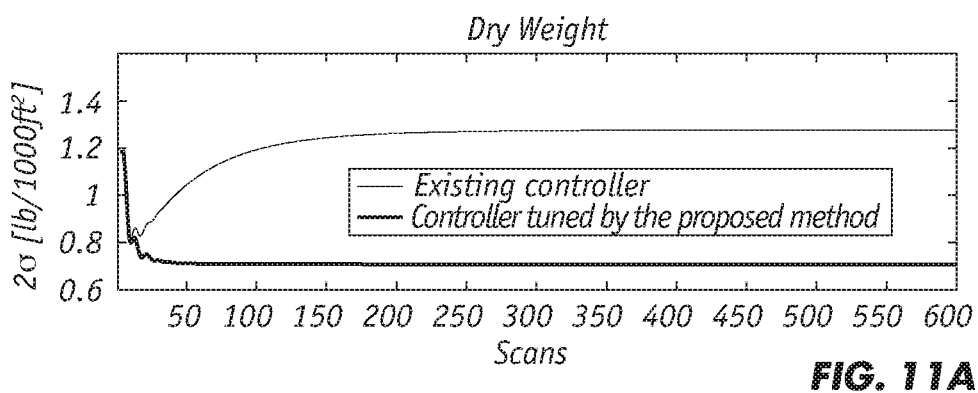
FIGS. 11(a) to 11(b) are performance illustrations for the proposed robust temporal tuning method.
Figure 11B:
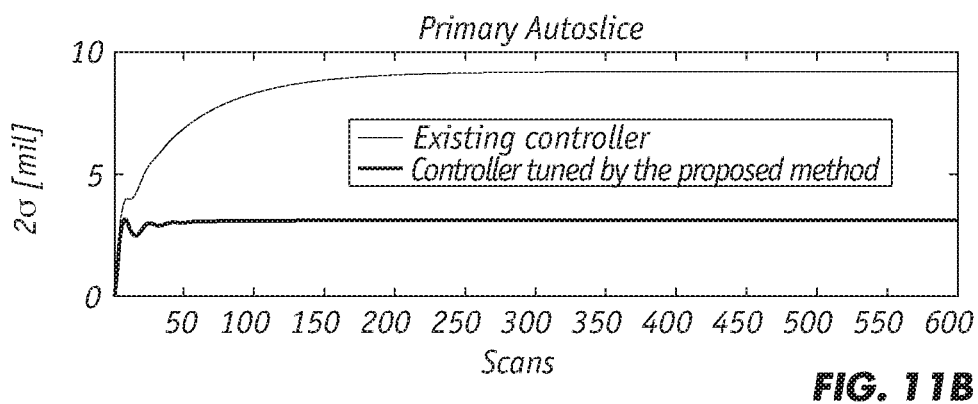

The overall tuning costs 6 seconds on a computer with Intel i5 core and 6G memory. The temporal tuning provides $\alpha=1.6821$ (see FIG. 10, which shows that the requirement $OS(2\sigma(u))<OS^*$ is satisfied), and the spatial parameters are chosen based on the existing robust spatial tuning method. We then apply the obtained tuning results to the Honeywell real time MPC+simulator environment and compare the obtained results with that of the existing controller. Note that the real process model $G_p$ is selected satisfying (26). The performance is shown in FIGS. 11(*a*)-11(*b*). FIGS. 11(*a*) and 11(*b*) illustrate the $2\sigma$ spreads for the measurement profile and actuator profile, in which we can see that the proposed tuning approach can achieve much better temporal performance in both the measurement and actuator profiles. More specifically, it is observed that the measurement $2\sigma$ spread even becomes larger than its initial value for the existing controller under the pre-specified parametric uncertainty when it approaches the steady-state, which illustrates the robustness of the proposed method.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

What is claimed is:

1. A system which forms a material in a spatially-distributed multivariable-array cross-directional process wherein the system comprises:
at least one set of actuator arrays each distributed adjacent to the material in cross direction (CD), wherein each set of actuator arrays is controllable to vary properties of the material;
a scanning sensor for measuring and acquiring properties data about the properties of the material; and
a multivariable model predictive controller (MPC) providing CD control of the CD process, wherein the MPC, in response to signals that are indicative of the properties of the material, provides signals to the at least one set of actuator arrays to control properties of the material, wherein the MPC includes an interface to allow a processing device to receive:
nominal temporal model parameters and corresponding parametric uncertainty specifications; and
a specified worst-case 2 sigma ($2\sigma$) overshoot limit for a CD actuator profile;
for temporally tuning the MPC, the processing device is configured to:
(a) develop a robust temporal stability condition based on the parametric uncertainty specifications;
(b) calculate a lower bound for a profile trajectory tuning parameter that assures robust stability, comprising;
generating a reference trajectory using a temporal filter comprising a parameter; and
calculating a lower bound for the profile trajectory tuning parameter using an automatic tuning algorithm;
(c) reduce a possible range of the tuning parameter by using a frequency domain technique; and
(d) perform an intelligent search for the tuning parameter that minimizes worst-case measurement $2\sigma$ settling time without exceeding the actuator worst-case $2\sigma$ overshoot limit.

2. The system of claim 1 wherein the nominal temporal model parameters comprise parameters of a temporal mathematical model of the process.

3. The system of claim 2 wherein the parametric uncertainty comprises trust ranges around the nominal temporal model parameters which characterize possible mismatch between the temporal mathematical model and real process.

4. The system of claim 1 wherein the worst-case $2\sigma$ overshoot limit comprises the largest overshoot of all possible $2\sigma$ spreads given parametric uncertainty specifications.

5. The system of claim 1 wherein the profile trajectory tuning parameter comprises the parameter in the temporal filter that affects aggressiveness of the reference trajectory.

6. The system of claim 1 wherein worst-case measurement $2\sigma$ settling time comprises the longest settling time of all possible $2\sigma$ spreads given parametric uncertainty specifications.

7. The system of claim 1 wherein the robust temporal stability condition is characterized by a requirement that on temporal frequency response of closed-loop system which guarantees robust stability under the parametric uncertainty.

8. The system of claim 1 wherein the lower bound of the profile trajectory tuning parameter comprises the smallest value of the tuning parameter that guarantees the robust stability.

9. The system of claim 1 wherein the possible range of the tuning parameter comprises a range of tuning parameters within which an optimal tuning parameter exists.

10. The system of claim 1 wherein the MPC includes the processing device for temporally tuning the MPC with respect to one of the actuator arrays.

11. In a process control system having a multivariable model predictive controller (MPC) providing control to a spatially-distributed multiple-array, sheetmakin, cross-directional (CD) process having at least one manipulated actuator array and at least one controlled measurement array, a method of providing control of the multiple-array process that comprises the steps of:
(a) tuning the MPC by the steps of:
(i) inputting nominal temporal model parameters and corresponding parametric uncertainty specifications;
(ii) specifying a worst-case 2 sigma ($2\sigma$) overshoot limit for a CD actuator profile;
(iii) developing a robust temporal stability condition based on the parametric uncertainty specifications;
(iv) calculating a lower bound for a profile trajectory tuning parameter that assures robust stability, comprising;
generating a reference trajectory using a temporal filter comprising a parameter; and
calculating a lower bound for the profile trajectory tuning parameter using an automatic tuning algorithm;
(v) reducing a possible range of the tuning parameter by using a frequency domain technique; and
(vi) performing an intelligent search for the tuning parameter that minimizes worst-case measurement $2\sigma$ settling time without exceeding the actuator worst-case $2\sigma$ overshoot limit;
(b) inputting the tuning parameters into the MPC; and
(c) controlling the multiple-array CD process with the MPC.

12. The method of claim 11 wherein the nominal temporal model parameters comprise parameters of a temporal mathematical model of the process.

13. The method of claim 12 wherein the parametric uncertainty comprises trust ranges around the nominal temporal model parameters which characterize possible mismatch between the temporal mathematical model and real process.

14. The method of claim 11 wherein the worst-case $2\sigma$ overshoot limit comprises the largest overshoot of all possible $2\sigma$ spreads given parametric uncertainty specifications.

15. The method of claim 11 wherein the profile trajectory tuning parameter comprises the parameter in the temporal filter that affects aggressiveness of the reference trajectory.

16. The method of claim 11 wherein worst-case measurement $2\sigma$ settling time comprises the longest settling time of all possible $2\sigma$ spreads given parametric uncertainty specifications.

17. The method of claim 11 wherein the robust temporal stability condition is characterized by a requirement that on temporal frequency response of closed-loop system which guarantees robust stability under the parametric uncertainty.

18. The method of claim 11 wherein the lower bound of the profile trajectory tuning parameter comprises the smallest value of the tuning parameter that guarantees the robust stability.

19. The method of claim 11 wherein the possible range of the tuning parameter comprises a range of tuning parameters within which an optimal tuning parameter exists.

20. A non-transitory computer readable medium embodying a computer program for automatically tuning a model predictive controller (MPC) employed to control a cross-directional process having a manipulated actuator array comprising a plurality of actuators and at least one controlled measurement array wherein the program comprises readable program code for:
- (a) inputting nominal temporal model parameters and corresponding parametric uncertainty specifications;
- (b) specifying a worst-case 2 sigma ($2\sigma$) overshoot limit for a CD actuator profile;
- (c) developing a robust temporal stability condition based on the parametric uncertainty specifications;
- (d) calculating a lower bound for a profile trajectory tuning parameter that assures robust stability, comprising:
    generating a reference trajectory using a temporal filter comprising a parameter; and
    calculating a lower bound for the profile trajectory tuning parameter using an automatic tuning algorithm;
- (e) reducing a possible range of the tuning parameter by using a frequency domain technique; and
- (f) performing an intelligent search for the tuning parameter that minimizes worst-case measurement $2\sigma$ settling time without exceeding the actuator worst-case $2\sigma$ overshoot limit.

\* \* \* \* \*